United States Patent
Truelove et al.

(10) Patent No.: US 10,624,057 B2
(45) Date of Patent: Apr. 14, 2020

(54) TELECOMMUNICATIONS APPARATUS AND METHODS

(71) Applicant: SONY CORPORATION, Tokyo (JP)

(72) Inventors: Stephen Truelove, Basingstoke (GB); Hideji Wakabayashi, Basingstoke (GB); Jussi Kahtava, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 628 days.

(21) Appl. No.: 14/781,161

(22) PCT Filed: Mar. 14, 2014

(86) PCT No.: PCT/GB2014/050784
§ 371 (c)(1),
(2) Date: Sep. 29, 2015

(87) PCT Pub. No.: WO2014/170632
PCT Pub. Date: Oct. 23, 2014

(65) Prior Publication Data
US 2016/0057730 A1    Feb. 25, 2016

(30) Foreign Application Priority Data
Apr. 19, 2013 (GB) .................................. 1307101.4

(51) Int. Cl.
*H04W 68/00* (2009.01)
*H04W 68/04* (2009.01)
(Continued)

(52) U.S. Cl.
CPC ......... *H04W 68/005* (2013.01); *H04W 48/20* (2013.01); *H04W 68/04* (2013.01);
(Continued)

(58) Field of Classification Search
CPC ..... H04W 48/20; H04W 76/02; H04W 4/005; H04W 68/005
(Continued)

(56) References Cited

U.S. PATENT DOCUMENTS 5,953,667 A    9/1999 Kauppi
8,472,982 B1   6/2013 Oroskar et al.
(Continued)

FOREIGN PATENT DOCUMENTS

JP    2011-512070 A    4/2011
WO   WO 94/07337 A1    3/1994
(Continued)

OTHER PUBLICATIONS

U.S. Appl. No. 14/781,172, filed Sep. 29, 2015, Truelove et al.
(Continued)

*Primary Examiner* — Marcus Hammonds
(74) *Attorney, Agent, or Firm* — Xsensus LLP

(57) ABSTRACT

A paging method in a wireless telecommunications system. A core network element selects a base station from plural base stations including a tracking area to have primary responsibility for paging a terminal device and conveys an indication of the terminal device to the selected base station. Each base station maintains a paging database identifying one or more terminal devices for which it has a responsibility for paging. When a terminal device is to be paged, the core network element transmits a paging request to the plural base stations including the tracking area. The respective base stations then determine whether to onward transmit a paging message for the terminal device based on a comparison between an identifier for the terminal device being paged with entries in their paging database, and if the
(Continued)

comparison indicates it has responsibility for paging the terminal device, it will transmit a paging message accordingly.

24 Claims, 6 Drawing Sheets

(51) Int. Cl.
    *H04W 76/10*     (2018.01)
    *H04W 48/20*     (2009.01)
    *H04W 68/06*     (2009.01)
    *H04W 4/70*     (2018.01)

(52) U.S. Cl.
    CPC .............. *H04W 76/10* (2018.02); *H04W 4/70* (2018.02); *H04W 68/06* (2013.01)

(58) Field of Classification Search
    USPC .......................... 455/434, 435.1, 422.1, 458
    See application file for complete search history.

(56) References Cited

U.S. PATENT DOCUMENTS

| | | | | |
|---|---|---|---|---|
| 2001/0049282 | A1* | 12/2001 | Ushiki ................. | H04W 68/04 455/435.2 |
| 2006/0058038 | A1* | 3/2006 | Das ...................... | H04W 68/00 455/456.1 |
| 2010/0069062 | A1* | 3/2010 | Horn .................... | H04W 60/00 455/434 |
| 2010/0210288 | A1* | 8/2010 | Kim ..................... | H04W 68/02 455/458 |
| 2014/0146795 | A1* | 5/2014 | Tian ..................... | H04W 68/02 370/336 |
| 2016/0057730 | A1* | 2/2016 | Truelove .............. | H04W 68/04 455/434 |

FOREIGN PATENT DOCUMENTS

| | | |
|---|---|---|
| WO | WO 96/01030 A2 | 1/1996 |
| WO | WO 99/59370 A1 | 11/1999 |
| WO | WO 2009/091743 A2 | 7/2009 |

OTHER PUBLICATIONS

International Search Report dated Oct. 6, 2014, in PCT/GB2014/050784 filed Mar. 14, 2014.
Great Britain Search Report dated Oct. 18, 2013, in Great Britain Application 1307101.4 filed Apr. 19, 2013.
"Digital cellular telecommunications system (Phase 2+); Universal Mobile Telecommunications System (UMTS); LTE; Service requirements for Machine-Type Communications (MTC); Stage 1, (3GPP TS 22.368 version 10.5.0 Release 10)" ETSI TS 122 368 v10.5.0, (Jul. 2011), 18 pages.
Harri Holma, et al., "LTE for UMTS OFDMA and SC-FDMA Based Radio Access," John Wiley and Sons, 2009 (4 pages).
"LTE; Evolved Universal Terrestrial Radio Access (E-UTRA); Medium Access Control (MAC) protocol specification (3GPP TS 36.321 version 8.9.0 Release 8)", ETSI TS 136 321 v8.9.0, (Jul. 2010), 49 pages.
"LTE; Evolved Universal Terrestrial Radio Access (E-UTRA); Radio Resource Control (RRC); Protocol specification (3GPP TS 36.331 version 11.2.0 Release 11)", ETSI TS 136 331 v11.2.0, (Feb. 2013), 345 pages.
Office Action dated Oct. 24, 2017 in parallel Japanese Application No. 2016-508226, (with English Translation) 6 pages.
Huawei, Network Improvement for Low Mobility, 3GPP TSG SA WG2 Meeting #76 S2-097484, Nov. 20, 2009, San Jose Del Cabo, section 4 pages.
Office Action dated May 31, 2018, in European Patent Application No. 14711584.4.

* cited by examiner

TELECOMMUNICATIONS APPARATUS AND METHODS

CROSS-REFERENCE TO RELATED APPLICATIONS

The present application is based on PCT filing PCT/GB2014/050784 field Mar. 14, 2014, claims priority to British Patent Application 1307101.4, filed in the UK IPO on Apr. 19, 2013, the entire contents of each of which being incorporated herein by reference.

BACKGROUND OF THE INVENTION

The present invention relates to methods, systems and apparatus for use in wireless (mobile) telecommunications systems, and in particular to paging procedures in such systems.

Third and fourth generation mobile telecommunication systems, such as those based on the 3GPP defined UMTS and Long Term Evolution (LTE) architectures, are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage areas for these networks is expected to increase rapidly.

The anticipated widespread deployment of third and fourth generation networks has led to the parallel development of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, might be located in a customer's house and periodically transmit information back to a central MTC server relating to the customer's consumption of a utility, such as gas, water, electricity and so on. Further information on characteristics of MTC-type devices can be found, for example, in the corresponding standards, such as ETSI TS 122 368 V10.530 (2011 July)/3GPP TS 22.368 version 10.5.0 Release 10) [1]. Some typical characteristics of MTC type terminal devices/MTC type data might include, for example, characteristics such as low mobility, high delay tolerance, small data transmissions, a level of predictability for traffic usage and timing (i.e. traffic profile), relatively infrequent transmissions and group-based features, policing and addressing.

As a result of the increasing use of wireless telecommunications networks there is a desire to ensure networks can support a corresponding increase in traffic. One particular area where capacity issues may arise is for paging procedures. As well as being of a concern generally, the paging capacity of networks could potentially become one of the key considerations for providing widespread support for MTC devices. This is because MTC devices can be expected to be introduced into networks in much larger numbers than conventional terminal devices, perhaps by an order of magnitude or more. Furthermore, in addition to the expected large number of MTC devices, the nature of machine-to-machine/MTC-type traffic means the ratio of idle devices to active devices can be expected to be relatively high among MTC devices. Consequently, it may be expected the majority of MTC terminal device in a network will be in an idle state with the network reliant on paging to initiate communications with the device. Furthermore still, for power saving purposes it can be expected that many MTC devices will use discontinuous transmission and reception techniques in communicating with the network. The consequent reduction in the number of available paging occasions for such devices adds further to the likelihood of paging capacity becoming a bottleneck in wireless telecommunications systems.

There is therefore a desire for methods and apparatus which support paging procedures that can help reduce the potential for paging congestion in wireless telecommunications systems.

SUMMARY OF THE INVENTION

According to a first aspect of the invention there is provided a method of operating a base station in a wireless telecommunications system comprising a core network, a plurality of base stations and a plurality of terminal devices, the method comprising: identifying one or more terminal devices for which the base station is to have a responsibility for paging; maintaining a paging database identifying the one or more terminal devices for which the base station is to have a responsibility for paging; receiving from the core network a paging request conveying an identifier for a terminal device being paged in the wireless telecommunications system; and determining whether or not to transmit a paging message for the terminal device being paged by comparing the identifier for the terminal device being paged with entries in the paging database to determine if the base station has a responsibility for paging the terminal device being paged.

In accordance with certain embodiments the step of identifying the one or more terminal devices for which the base station has a responsibility for paging comprises receiving an indication of the one or more terminal devices from the core network.

In accordance with certain embodiments the step of identifying the one or more terminal devices for which the base station has a responsibility for paging comprises receiving an indication of the one or more terminal devices from another base station of the wireless telecommunications system.

In accordance with certain embodiments the method further comprises conveying an identifier for the terminal device being paged to one or more further base stations to request the one or more further base stations transmit a paging message for the terminal device being paged.

In accordance with certain embodiments the one or more further base stations are selected based on channel condition reports received by the base station from the terminal device being paged.

In accordance with certain embodiments the base station and the one or more further base stations comprise a predefined group of base stations.

In accordance with certain embodiments the method further comprises receiving from the core network a subsequent paging request conveying the identifier for the terminal device being paged, and, in response thereto, transmitting a paging message for the terminal device being paged irrespective of the contents of the paging database.

In accordance with certain embodiments the method further comprises receiving from the core network a further paging request conveying an identifier for a terminal device being paged in the wireless telecommunications system, determining that the further paging request has a characteristic which indicates the base station should transmit a paging message for the terminal device identified in association with the further paging request irrespective of the contents of the paging database, and transmitting a paging message for the terminal device identified in association with the further paging request.

In accordance with certain embodiments the method further comprises receiving from another base station a paging request conveying an identifier for a further terminal device being paged in the wireless telecommunications system, and transmitting a paging message for the further terminal device being paged irrespective of the contents of the paging database.

In accordance with certain embodiments the method further comprises transmitting a paging message for the terminal device being paged if it is determined the base station has a responsibility for paging the terminal device being paged.

In accordance with certain embodiments the method further comprises determining whether a response to the paging message is received from the terminal device.

In accordance with certain embodiments the method further comprises transmitting signalling to the core network to indicate a failure to page the terminal device if a response to the paging message is not received from the terminal device.

In accordance with certain embodiments the method further comprises modifying the paging database to indicate the base station no longer has a responsibility for paging the terminal device if a response to the paging message is not received from the terminal device.

In accordance with another aspect of the invention there is provided a base station for use in a wireless telecommunications system comprising a core network, a plurality of base stations and a plurality of terminal devices, wherein the base station is configured to: identify one or more terminal devices for which the base station is to have a responsibility for paging; maintain a paging database identifying the one or more terminal devices for which the base station is to have a responsibility for paging; receive from the core network a paging request conveying an identifier for a terminal device being paged in the wireless telecommunications system; and determine whether or not to transmit a paging message for the terminal device being paged by comparing the identifier for the terminal device being paged with entries in the paging database to determine if the base station has a responsibility for paging the terminal device being paged.

In accordance with another aspect of the invention there is provided a method of operating a terminal device in a wireless telecommunications system comprising a base station and a terminal device, the method comprising: determining an indication of a degree of mobility for the terminal device within the wireless telecommunications system; and conveying an indication of the degree of mobility to the base station.

In accordance with certain embodiments the indication of the degree of mobility for the terminal device is stored as a configuration setting for the terminal device.

In accordance with certain embodiments the indication of the degree of mobility for the terminal device is conveyed to the base station as part of a radio resource control signalling procedure.

In accordance with certain embodiments the indication of the degree of mobility for the terminal device is conveyed to the base station in association with an establishment cause for the terminal device accessing the base station.

In accordance with certain embodiments the indication of the degree of mobility for the terminal device comprises an indication of a power source for the terminal device.

In accordance with another aspect of the invention there is provided a terminal device for operating in a wireless telecommunications system comprising a base station and a terminal device, wherein the terminal device is configured to: determine an indication of a degree of mobility for the terminal device within the wireless telecommunications system; and convey an indication of the degree of mobility to the base station.

In accordance with another aspect of the invention there is provided a method of operating a core network element in a core network of a wireless telecommunications system comprising the core network, a plurality of base stations and a plurality of terminal devices, the method comprising: selecting a base station from among the plurality of base stations to have a responsibility for paging a specific terminal device; conveying an indication of the specific terminal device to the selected base station; subsequently determining the specific terminal device should be paged; and transmitting a paging request conveying an identifier for the specific terminal device to a plurality of base stations including the selected base station.

In accordance with certain embodiments the selected base station is selected on the basis of it being a base station through which the core network has previously received uplink signalling associated with the specific terminal device.

In accordance with certain embodiments the selected base station is a base station through which the core network has most recently received uplink signalling from the specific terminal device.

In accordance with certain embodiments the uplink signalling associated with the specific terminal device comprises signalling for establishing a radio resource control, RRC, connection.

In accordance with certain embodiments the signalling for establishing a RRC connection for the specific terminal device is associated with a network attach procedure for the specific terminal device.

In accordance with certain embodiments the uplink signalling associated with the specific terminal device comprises a response to a previous paging request for the specific terminal device.

In accordance with certain embodiments the method further comprises transmitting a further paging request conveying an identifier for the specific terminal device to a plurality of base stations.

In accordance with certain embodiments the first mentioned paging request and the further paging request are transmitted with different characteristics to indicate a base station should respond differently to the first mentioned paging request and the further paging request.

In accordance with certain embodiments the further paging request is transmitted in response to receiving signalling from the selected base station which indicates the selected base station has not received a response to a paging message transmitted by the selected base station for the specific terminal device.

In accordance with certain embodiments the further paging request is transmitted in response to the core network element not receiving a successful paging response associated with the specific terminal device.

In accordance with certain embodiments the plurality of base stations comprises a tracking area of the wireless telecommunications system.

In accordance with certain embodiments the paging request further conveys an indication of a way in which a base station receiving the paging request should react which is selected form a plurality of different ways in which a base station receiving a paging request could react.

In accordance with certain embodiments the plurality of different ways in which a base station receiving a paging request could react relate to how the base station should determine whether or not to transmit a paging message for the specific terminal device in response to receiving a paging request.

In accordance with another aspect of the invention there is provided a core network element for operating a core network of a wireless telecommunications system comprising the core network, a plurality of base stations and a plurality of terminal devices, wherein the core network element is configured to: select a base station from among the plurality of base stations to have a responsibility for paging a specific terminal device; convey an indication of the specific terminal device to the selected base station; subsequently determine the specific terminal device should be paged; and transmit a paging request conveying an identifier for the specific terminal device to a plurality of base stations including the selected base station.

It will be appreciated that features and aspects of the invention described above in relation to the certain aspects of the invention are equally applicable to, and may be combined with, embodiments of the invention according to other aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 1:
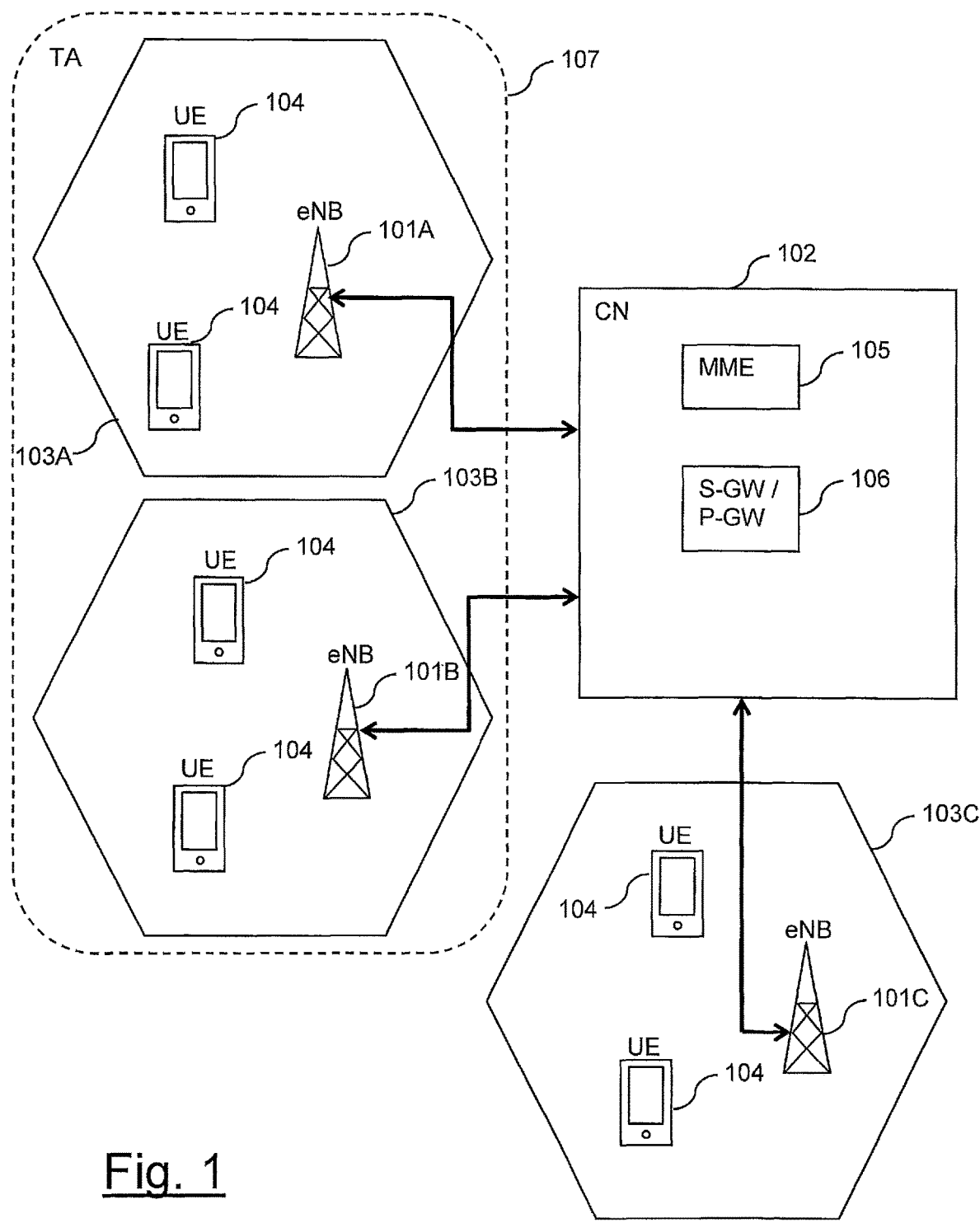
FIG. 1 schematically represents an example of a conventional LTE-type wireless telecommunication network.

FIG. 1 provides a schematic diagram illustrating some basic functionality of a wireless telecommunications network/system operating in accordance with LTE principles.

The various elements of FIG. 1 and their respective modes of operation and mutual interactions are well-known and defined in the relevant standards administered by the 3GPP® body and also described in many books on the subject, for example, Holma, H. and Toskala, A. [2].

The network includes a plurality of base stations 101A, B, C connected to a core network 102. Each base station provides a coverage area 103A, B, C (i.e. a communication cell) within which data can be communicated to and from various terminal devices 104. In accordance with conventional terminology, a terminal device may also be referred to as a mobile station, user equipment (UE), user terminal, mobile radio, and so forth. Similarly, a base stations may also be referred to as a transceiver station/nodeB/e-NodeB, eNB, and so forth. Furthermore, it will be appreciated the terms base station and cell may also sometimes be used interchangeably, for example, the process of a terminal device connecting to the radio access part of a wireless telecommunications system might be referred to as accessing a cell or accessing a base station. Nonetheless, it will be appreciated in some cases the physical apparatus comprising a base station may comprise equipment for supporting more than one communication cell and in such cases it can still be appropriate to draw a distinction between base stations and cells.

In terms of basic operation, data are transmitted between base stations 101A, B, C and terminal devices 104 using various radio downlink and uplink channels. The core network 102 routes data to and from terminal devices 104 via respective base stations 101A, B, C and provides functions such as authentication, mobility management, charging and so on. To this end, the core network (CN) 102 comprises a mobility management entity (MME) 105 and a serving gateway (S-GW) entity and a packet data network gateway (P-GW) entity. For simplicity the serving gateway entity and packet data network gateway are schematically represented in FIG. 1 as a single combined (S-GW/P-GW) gateway entity 106.

It is known for a group of base stations (with associated cells) to be logically grouped together into a so-called tracking area (TA). In FIG. 1 the communication cells 103A and 103B associated with base stations 101A and 101B are schematically represented as belonging to a tracking area 107. For this particular example it is assumed the communication cell 103C associated with base station 101C belongs to a different tracking area, although this other tracking area is not represented in the figure. The sizes of tracking areas are typically not specified in wireless telecommunications system specifications. However, a typical tracking area in an LTE-based network might be expected to include perhaps twenty base stations/cells, but could be more/fewer according to the implementation at hand. Tracking areas play a role in paging as discussed further below.

As is well understood, in various wireless telecommunications networks, such as the LTE-based network represented in FIG. 1, there are two Radio Resource Control (RRC) modes for terminal devices, namely: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are attached to the network, but not currently in active communication.

For a terminal device in RRC idle mode the core network (CN) 102 is aware the terminal device is present within the network, but the radio access network (RAN) part (comprising the base stations 101A, B, C) is not. More specifically, for a terminal device in RRC idle mode, core network nodes such as the MME 105 of FIG. 1 recognize the idle mode terminal device at a tracking area level. That is to say, the core network 102 does not attempt to keep track of terminal device locations at the level of individual communication cells/base stations, but seeks only to keep track of which tracking area the terminal device is currently located within. The core network will generally assume a terminal device is located within the tracking area(s) associated with the base station most recently accessed by the terminal device, unless the terminal device has since provided a specific tracking area update (TAU) to the network. (As is conventional, idle mode terminal device are typically required to send a TAU when they detect they have entered a different tracking area to allow the core network to keep track of their location.)

Because the core network tracks terminal devices at a tracking area level, it is generally not possible for the network infrastructure to know which specific base station to use when seeking to initiate contact with a terminal device in idle mode, and this has consequences for how paging procedure is in wireless telecommunication systems are performed.

Figure 2:
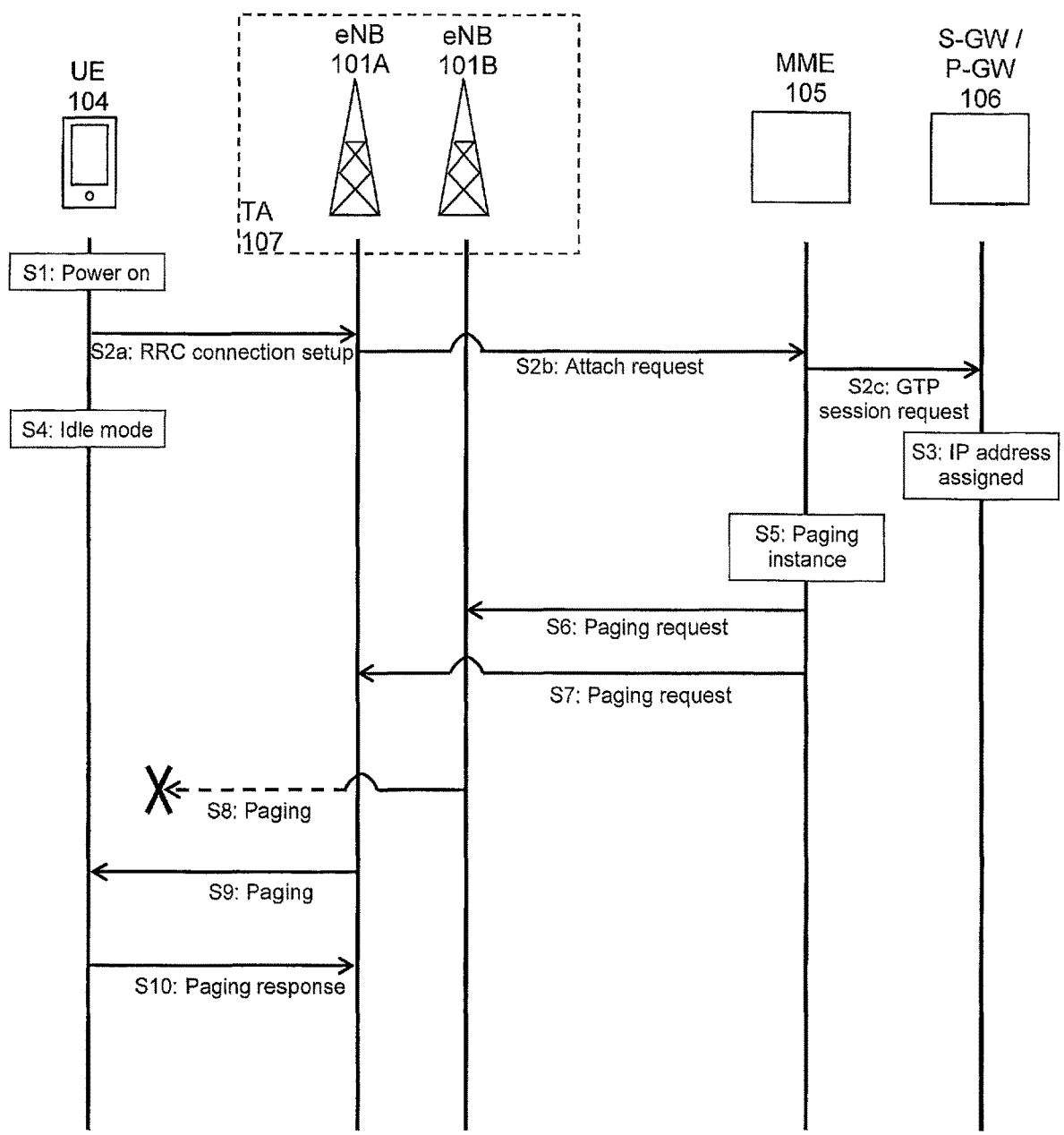
FIG. 2 is a signalling ladder diagram schematically representing a conventional paging procedure in a LTE-type wireless telecommunication network.

FIG. 2 is a signalling ladder diagram representing a conventional paging procedure for a terminal device 104 operating within the LTE-type network schematically represented in FIG. 1. FIG. 2 schematically represents signalling and operating functions associated with the terminal device 104, the base stations 101A, 101B comprising the tracking area 107, and the MME 105 and gateway 106 of the core network 102.

For the sake of this example it is assumed the terminal device 104 initially attaches to the network through base station 101A within the tracking area 107 before entering an idle mode. Furthermore, it is assumed the terminal device 104 has not moved to a different tracking area and so has not provided any tracking area update. Thus, the core network 102 will assume the terminal device is located somewhere within tracking area 107 (i.e. somewhere within the coverage areas of communication cells 103A and 103B which comprise the tracking area 107).

Thus, referring to FIG. 2, in step S1 the terminal device 104 is powered on.

In step S2 (comprising sub-steps S2a, S2b and S2c), and in accordance with conventional techniques, an RRC connection procedure (in this example an initial attach procedure) is initiated by the terminal device with signalling exchanged between the terminal device 104, the base station 101A, the MME 105, and gateway 106 as schematically represented in the figure. For LTE this signalling comprises RRC connection setup signalling from the terminal device 104 to the base station 101A (step S2a), attach request signalling from the base station 101A to the MME 105 (step S2b), and GPRS tunnel protocol session request signalling (step S2c).

As is well known, the specific base station through which the terminal device initially attaches may be determined from reference signal measurements, and so forth, whereby the terminal device determines which base station is most appropriate.

In step S3 the core network assigns an IP address for the terminal device. From this point the core network recognises the existence of the terminal device and keeps track of its location at a tracking area level as discussed above. Thus, in this particular example, the core network identifies the terminal device as being within tracking area 107 (because the terminal device has accessed the network through base station 101A, which is within tracking area 107).

Although not shown in FIG. 2 in the interests of simplicity, the base station 101A to which the terminal device 104 sends RRC connection setup signalling in step S2 and the terminal device 104 will exchange further signalling to allow the base station 101A to establish capability information for the terminal device 104. For example, the base station 101A will transmit a UE capability enquiry and the terminal device will respond with a UE capability information message.

As schematically represented in step S4, the terminal device having attached to the network and exchanged capability information with the base station, enters RRC idle mode. As is conventional, the base station 101A will discard the UE capability information associated with the terminal device at this stage.

In step S5 the MME 105 recognises that a paging instance has arisen for the terminal device 104. The specific reason for the paging requirement is not significant, and may, for example be because a third party is seeking to place a telephone call to the terminal device 104.

As has been discussed above, the MME 105 in the core network 102 can recognise the terminal device is located in one of the communication cells 103A and 103B which comprise tracking area 107, but the MME 105 does not know which one. Accordingly, the MME 105 sends a paging request message over the S1-AP interface to each of the base stations associated with the tracking area 107. Thus, in this example the MME 105 sends paging request messages to both base stations 101A and 101B, as schematically represented in steps S6 and S7. The MME 105 does not send a paging request message to the base station 101C serving communication cell 103C because communication cell 103C is not within tracking area 107 in which the terminal device is taken as being located.

The base stations receiving a paging request message from the MME 105, in this case base stations 101A and 101B, are configured to transmit paging signalling to seek to establish contact with the terminal device 104. This is schematically represented in FIG. 2 in steps S8 and S9.

It is assumed for this example the terminal device has remained within the coverage area 103A of base station 101A and so receives the paging signalling transmitted in step S9 by base station 101A, and responds accordingly, as schematically indicated in step S10. The paging signalling sent in step S8 by base station 101B is not received by the terminal device 104 and so is in effect wasted signalling.

Following step S10, the various elements represented in FIG. 2 may continue to exchange signalling in accordance with conventional techniques, for example depending on why the paging instance arose in step S5.

Thus, FIG. 2 schematically represents a conventional manner for paging terminal devices in RRC idle mode in a wireless telecommunications system. In summary, this conventional paging scheme involves all base stations in a given tracking area having to transmit paging signalling because it is not known where in the tracking area the terminal device is located, thereby giving rise to wasted paging signalling, such as represented in step S8.

Not only does wasted paging signalling such as represented in step S8 of FIG. 2 represent an inefficient use of radio resources, it can also be detrimental to the operation of terminal devices in the communication cells for which the paging signalling is wasted. This follows from the established nature of paging procedures in certain wireless telecommunications systems, such as LTE-based telecommunications systems as now explained.

Idle mode terminal devices are conventionally configured to seek paging message periodically. For terminal devices operating in a discontinuous reception (DRX) mode this occurs each time they wake up for their DRX active time. Paging signals for a specific terminal device are transmitted in defined frames (Paging Frames)/sub-frames (Paging Occasions) which are derived from the International Mobile Subscriber Identifier (IMSI) of the terminal device, as well as paging related DRX parameters established in system information transmitted within the network.

In a conventional LTE-based system, a terminal device thus receives and checks the contents of specific sub-frames (paging occasions) in specific frames (paging frames) to look for paging signalling. For example, in accordance with the standards set out in ETSI TS 136 321 V8.9.0 (2010 July)/3GPP TS 36.321 version 8.9.0 Release 8 [3], a Paging Frame (PF) is a downlink radio frame which may contain one or more Paging Occasion(s) (PO), where a Paging Occasion is a sub-frame in which there may be paging signalling. Paging signalling is conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by ETSI TS 136 321 V8.9.0 (2010 July)/3GPP TS 36.321 version 8.9.0 Release 8 [3]). All terminal devices check whether PDCCH at the specific PF/PO includes P-RNTI or not. If there is a PDSCH allocation addressed to P-RNTI in the relevant subframe, the terminal device proceeds to seek to receive and decode the paging messages transmitted on the allocated resources on PDSCH.

Because a common P-RNTI is used for all terminal devices, this means all terminal devices are required to decode the resources on PDSCH indicated by an allocation message addressed to P-RNTI if this is received on PDCCH in a subframe corresponding to one of the terminal devices' paging occasions. Multiple terminal devices may be associated with the same paging occasions and this means terminal devices will sometimes identify an allocation message addressed to P-RNTI on one of their paging occasions, and so decode the corresponding paging message (sent on the paging channel PCH using PDSCH resources), only to find it is a different terminal device being paged (the paging message includes terminal device identifiers (S-TMSI) to identify the terminal devices that are in fact being paged). A terminal device which identifies its S-TMSI in the paging message conveyed on PCH proceeds to establish RRC connection with the network to determine the cause of the paging. A terminal device which does not identify its S-TMSI in the paging message recognises the paging as false paging and returns to DRX until its next paging occasion.

Accordingly, not only does the wasted paging signalling in step S8 of FIG. 2 represent a waste of radio resources, it can cause terminal devices in communication cell 103B with the same paging occasion to waste resources in unnecessarily decoding and processing PCH on PDSCH.

In broad summary, the tracking area approach discussed above, and in particular the size of tracking areas, establishes a compromise between the amount of signalling required to establish paging (and associated false paging) and the amount of signalling required to keep track of where terminal devices are within a network.

On the one hand, if tracking areas are made small (i.e. comprising a small number of communication cells), there can be expected to be a reduction in the amount of wasted paging signalling/false paging because there will be a correspondingly smaller number of communication cells transmitting paging signalling when the network seeks to contact a terminal device that is somewhere within a given tracking area. However, with small tracking areas there can be expected to be an increase in tracking area update signalling as terminal devices will more frequently move between tracking areas.

If, on the other hand, tracking areas are made large (i.e. comprising a large number of communication cells), there can be expected to be an increase in the amount of wasted paging signalling/false paging because there will be a correspondingly larger number of communication cells transmitting paging signalling for a terminal device that is assumed to be located somewhere within a given tracking area. However, with large tracking areas there can be expected to be a reduction in tracking area update signalling as terminal devices will less frequently move between tracking areas.

One previously-proposed approach which seeks to address some of these issues is to allow terminal devices to in effect be members of multiple tracking areas. Terminal devices may thus be provided with an indication of multiple tracking areas to which they are assigned and be configured to not send tracking area updates when they move among these tracking areas. However, the list of tracking areas that may be assigned for each terminal device is limited to 16 and so this approach may still not provide an appropriate solution where very small tracking areas (e.g. individual communication cells) are desired. Another previously proposed approach is to allow a base station to be included in multiple tracking areas. Thus, subgroups of base stations in a tracking area may be defined as comprising a separate smaller tracking area within the larger tracking area. However, this approach lacks flexibility since the tracking areas are pre-defined and the subdivision will not suit all locations within the larger tracking area.

Conventional LTE systems are primarily designed to support relatively mobile terminal devices which have relatively high processing and power capabilities. Consequently, relatively large tracking areas are often adopted. The relatively large tracking areas allow for relatively high mobile terminal mobility without triggering an unacceptable amount of tracking area update signalling, while the relatively high processing and power capabilities of the terminal devices mean they are not unduly affected by the consequences of false paging.

Accordingly, the inventors have recognised that existing approaches for paging are perhaps less well-suited for certain types of device, such as machine type communication devices, for which power management may be a more significant concern (and hence the impact of false paging considered more severe), and which are less mobile than conventional devices (and hence less likely to give rise to significant amounts of tracking area update signalling, even for relatively small tracking areas). For example, the location of a smart meter terminal device can be expected to be fixed once the devices installed. Consequently, a smaller tracking area then is typically adopted in wireless telecommunications systems could be used for such a class of device without giving rise to increased traffic area update signalling. Another example of low mobility terminal devices might be those incorporated within home electronics products, such as a television or a games console. While such devices are nominally portable, they can remain stationary for relatively long periods of time, and when such devices are moved, they will often be moved only short distances, for example within the same premises. Terminal devices having this type of mobility are sometimes referred to as nomadic devices. Because of their relatively low mobility, nomadic devices could also be well served with smaller tracking areas than are normally employed.

With this in mind, the inventors have developed new paging procedures for use in wireless telecommunications systems, such as LTE-based telecommunications systems, which may, in particular but not exclusively, be well-suited for terminal devices having MTC-type characteristics.

Figure 3:
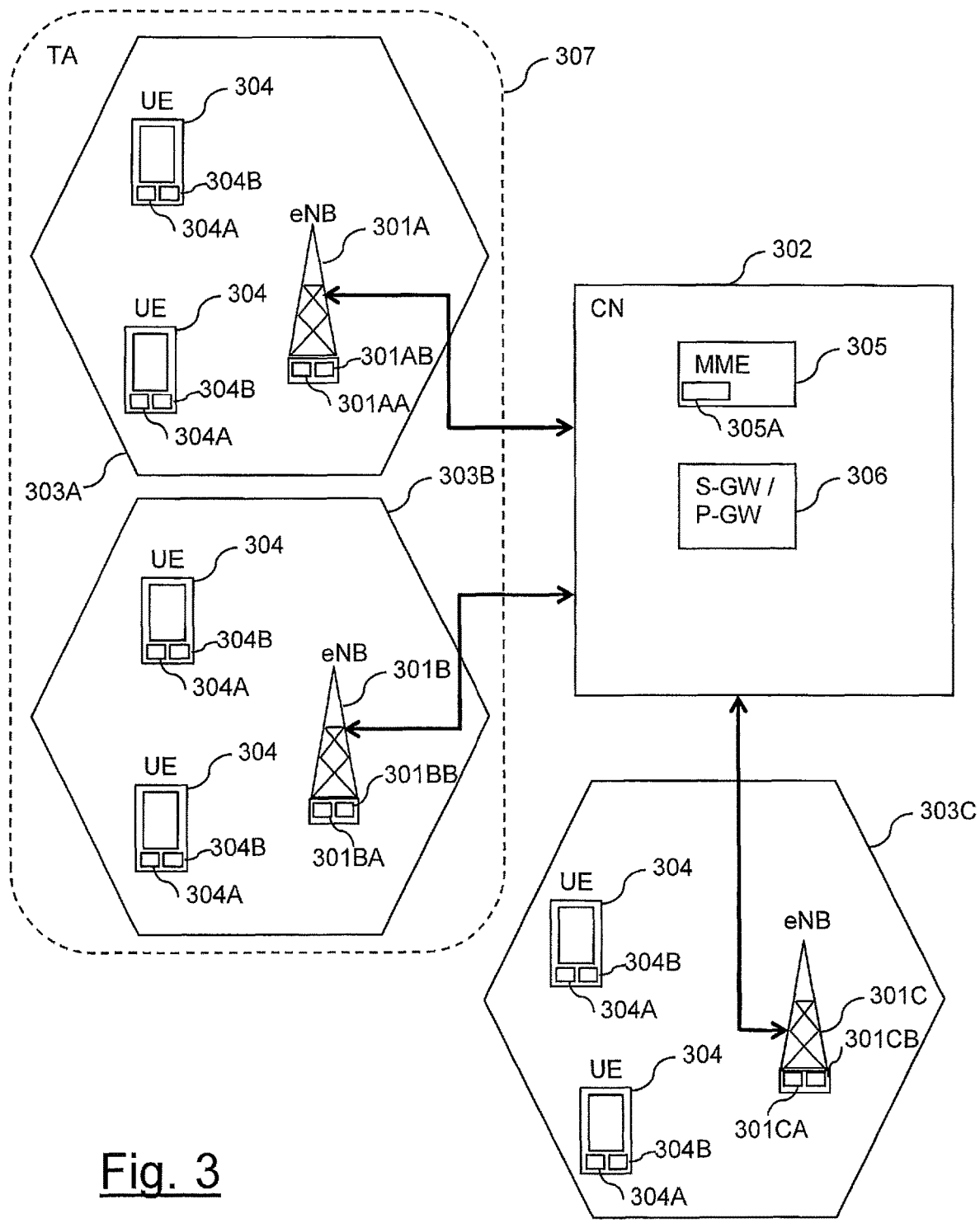
FIG. 3 schematically represents a wireless telecommunication network configured to operate in accordance with certain embodiments of the invention.

FIG. 3 is a schematic diagram showing part of a telecommunications system arranged in accordance with an example of the present invention. The telecommunications system in this example is based broadly on an LTE-type architecture. As such many aspects of the general architecture and of the operation of the telecommunications system are known and understood, for example as discussed above with reference to corresponding elements of FIG. 1, and are not described here in detail in the interest of brevity. It will thus be appreciated that those operational aspects of telecommunications systems in accordance with embodiments of the invention which are not specifically described herein may be implemented in accordance with any known techniques, for example according to the current LTE standards or as described in the many books available on the subject, for example, Holma, H. and Toskala, A. [2].

Represented in FIG. 3 are three communication cells (coverage areas) 303A, B, C supported by respective base stations 301A, B, C coupled to a core network 302. It will of course be appreciated that in general a system such as that represented in FIG. 3 will comprise a greater number of cells arranged to provide coverage over a more extended geographic area. As is conventional for LTE-type networks, the respective base stations 301A, B, C may communicate with one another over the so-called X2 interface which interconnects base stations in a peer-to-peer fashion. The core network (CN) 302 comprises a mobility management entity (MME) 305 and a serving gateway (S-GW) entity and a packet data network gateway (P-GW) entity. For simplicity the serving gateway entity and packet data network gateway are schematically represented in FIG. 3 as a single combined (S-GW/P-GW) gateway entity 306.

As discussed above, it is known for groups of base stations (with their associated communication cells/coverage areas) to be logically grouped together into tracking areas (TAs). In FIG. 3 the communication cells 303A and 303B associated with base stations 301A and 301B are schematically represented as belonging to a tracking area 307. For this particular example it is assumed the communication cell 303C associated with base station 301C belongs to a different tracking area, although this other tracking area is not represented in the figure. The principles underlying the selected groupings of communication cells into tracking areas (e.g., in terms of tracking area size) in the wireless telecommunications system of FIG. 3 may follow the same principles as for conventional wireless telecommunications systems. For example, a typical tracking area might comprise on the order of a few tens of communication cells.

Communication cell 303A thus includes a base station (enhanced Node B/eNB) 301A connected to the core network 302. The base station 301A comprises a transceiver unit 301AB for transmission and reception of wireless signals and a controller unit 301AA configured to control the base station 301A. The controller unit 301AA may comprise various sub-units comprising functional units for providing functionality in accordance with embodiments of the invention as explained herein. These sub-units may be implemented as discrete hardware elements or as appropriately configured functions of the controller unit. Thus, the controller unit 301AA may comprise a processor unit which is suitably configured/programmed to provide the desired functionality described herein using conventional programming/configuration techniques for equipment in wireless telecommunications systems. The transceiver unit 301AB and the controller unit 301AA are schematically shown in FIG. 3 as separate elements for ease of representation. However, it will be appreciated that the functionality of these units can be provided in various different ways following established practices in the art, for example using a single suitably programmed integrated circuit coupled to an antenna. It will be appreciated the base station 301A will in general comprise various other elements associated with its operating functionality. The base station 301A may communicate with a plurality of conventional LTE terminals 304 within the coverage area of the cell 303A generally in accordance with conventional techniques. Operational aspects of the base station 301A which are not described herein may be implemented in accordance with conventional techniques.

The various elements and functionality associated with the communication cells 303B and 303C are in essence the same as for the communication cell 303A and as such it will be appreciated the various elements of communication cells 303B, 303C represented in FIG. 3 are similar to, and will be understood from, the corresponding elements of communication cell 303A and are not separately described in the interests of brevity.

Each terminal device 304 represented in FIG. 3 comprises a transceiver unit 304B for transmission and reception of wireless signals and a controller unit 304A configured to control the terminal device 304. The controller unit 304A may comprise various sub-units for providing functionality in accordance with embodiments of the invention as described herein. These sub-units may be implemented as discrete hardware elements or as appropriately configured functions of the controller unit. Thus the controller unit 304A may comprise a processor unit which is suitably configured/programmed to provide the desired functionality described herein using conventional programming/configuration techniques for equipment in wireless telecommunications systems. The transceiver unit 304B and the controller unit 304A are schematically shown in FIG. 3 as separate elements for ease of representation. However, it will be appreciated that the functionality of these units can be provided in various different ways following established practices in the art, for example using a single suitably programmed integrated circuit. It will be appreciated the terminal device 304 will in general comprise various other elements associated with its operating functionality. Operational aspects of the terminal device 304 which are not described herein may be implemented in accordance with conventional techniques.

The MME entity 305 represented in FIG. 3 comprises a controller unit 305A configured to control the MME entity 305. The controller unit 305A may comprise various sub-units for providing functionality in accordance with embodiments of the invention as described herein. These sub-units may be implemented as discrete hardware elements or as appropriately configured functions of the controller unit. Thus the controller unit 305A may comprise a processor unit which is suitably configured/programmed to provide the desired functionality described herein using conventional programming/configuration techniques for equipment in wireless telecommunications systems. Operational aspects of the MME entity 305 which are not described herein may be implemented in accordance with conventional techniques.

Various paging procedures in accordance with embodiments of the invention may be implemented in the wireless telecommunications system represented in FIG. 3. In a general sense, certain embodiments of the invention are directed to schemes in which a base station is configured to maintain a record of terminal devices for which it is deemed to have a responsibility for paging and to selectively transmit paging messages within its communication cell in response to requests received from the core network in dependence on whether or not the base station records indicate the base station is deemed responsible for paging the terminal device being paged.

Figure 4:
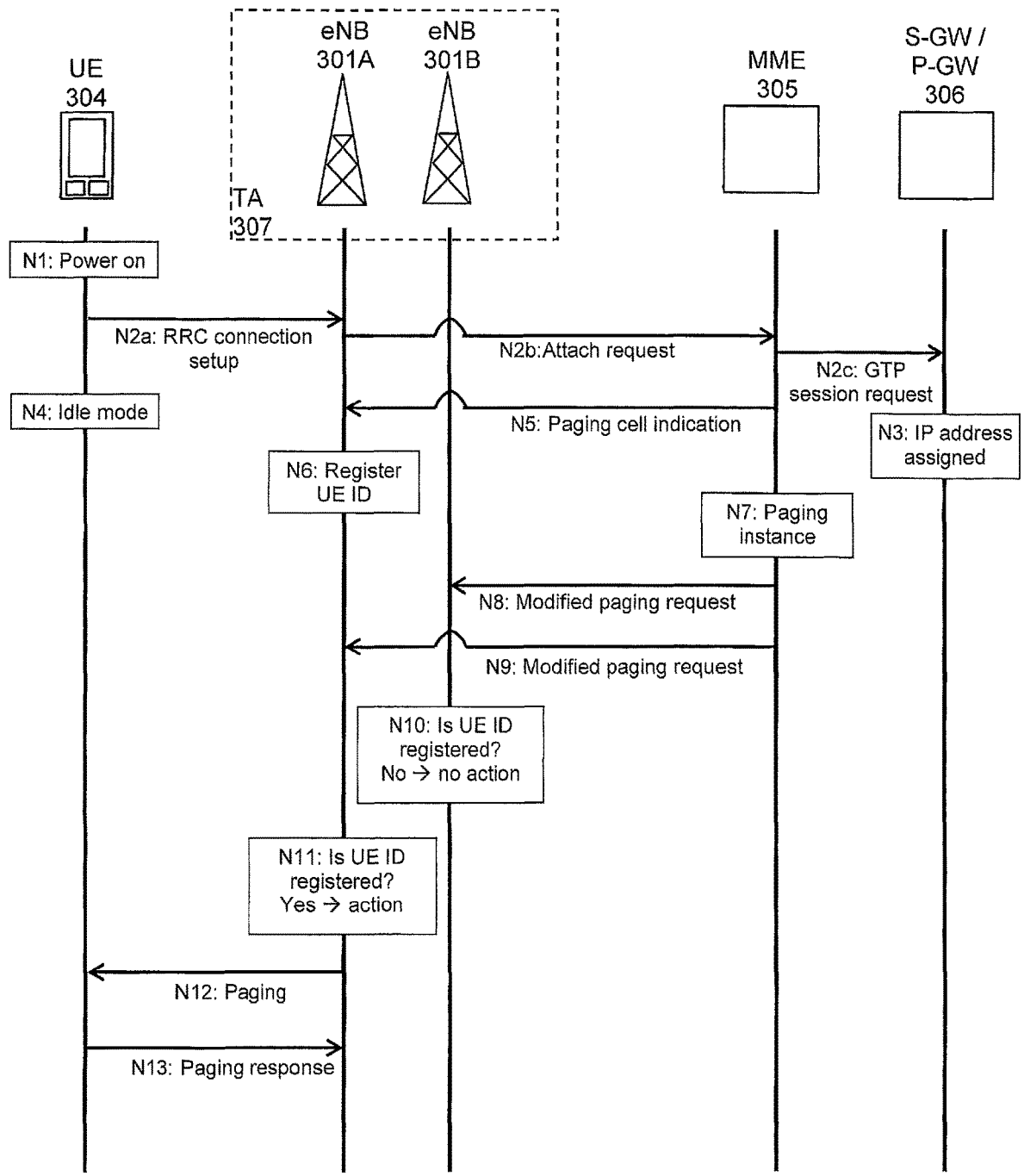
FIG. 4 is a signalling ladder diagram schematically representing a paging procedure in accordance with certain embodiments of the invention.

FIG. 4 is a signalling ladder diagram representing a paging procedure for a terminal device 304 operating within the LTE-type network schematically represented in FIG. 3 in accordance with an embodiment of the invention. FIG. 4 schematically represents signalling and operating functions associated with the terminal device 304, the base stations 301A and 301B comprising the tracking area 307, and the MME 305 and gateway 306 of the core network 302.

For the sake of this example it is assumed the terminal device 304 initially attaches to the network through base station 301A (i.e. the terminal device 304 is within the coverage area associated with communication cell 303A) in the tracking area 307 and then enters an idle mode. It is also assumed for this particular example the terminal device 304 remains within the coverage of the cell 303A throughout the procedure represented in FIG. 4, for example because the terminal device is a low mobility terminal device, such as an MTC device.

Thus, referring to FIG. 4, in step N1 the terminal device 304 is powered on.

In step N2 (comprising sub-steps N2a, N2b and N2c), and in accordance with conventional techniques, an RRC connection procedure (in this example an initial attach procedure) is initiated by the terminal device 304 with signalling exchanged between the terminal device 304, the base station 301A, the MME 305, and gateway 306 in the known manner as schematically represented in the figure.

In step N3 the core network assigns an IP address for the terminal device. From this point the core network recognises the existence of the terminal device and keeps track of its location at a tracking area level as discussed above. Thus, in this particular example, the core network identifies, and makes a record of, the terminal device as being within tracking area 307 (because the terminal device has accessed the network through base station 301A, which is within tracking area 307).

As schematically represented in step N4, the terminal device having attached to the network, enters RRC idle mode. Although not shown in FIG. 4 in the interests of simplicity, the terminal device 304 and the base station 301A through which the terminal device initiates the attachment procedure of step N2 may exchange signalling relating to the terminal device's capability information in accordance with generally conventional techniques. For example, in an LTE-type network, terminal device capability information may be exchanged using a UE capability enquiry message and a UE capability information response message procedure in accordance with the general principles set out in Section 5.6.3 of ETSI TS 136 331 V11.2.0 (2013 February)/3GPP TS 36.331 version 11.2.0 Release 11 [4]. This capability signalling can be exchanged during RRC connected mode before the terminal device switches to idle mode in step N4. In accordance with a conventional approach, the capability information relating to the terminal device may be discarded by the base station 301A when the RRC connected mode finishes with the terminal device switching to idle mode in step N4. However, in accordance with other embodiments as discussed further below, the base station 301A may retain a record of some or all aspects of the UE capability.

Thus the steps N1 to N4 represented in FIG. 4 may be performed in accordance with conventional techniques, such as also represented by steps S1 to S4 in FIG. 2.

However, as schematically represented in step N5, in accordance with embodiments of the invention, the core network 302, and in particular the MME entity 305, transmits signalling back to the base station 301A to indicate the identity of the terminal device 304 which initiated the RRC connection through the base station 301A. This signalling may be conveniently referred to as a paging cell indication message. In accordance with implementations in which paging procedures in accordance with embodiments of the invention are to be applied only for some terminal devices, for example predefined classes of terminal device, such as MTC devices, or specific terminal devices expected to have low mobility, the core network 302 may be configured to only send a paging cell indication message back to the relevant base station in relation to terminal devices for which paging procedures in accordance with embodiments of the invention are to be applied.

In step N6 the base station 301A receiving the paging cell indication message from the MME 305 establishes a record of the identifier for the indicated terminal device in a database associated with the base station 301A. Thus, in accordance with embodiments of the invention, the base station maintains a database of identifiers for terminal devices for which it is to be deemed responsible for paging. In accordance with this embodiment the database for a given base station is populated based on paging cell indication message(s) received from the core network indicating which terminal device(s) have accessed the network through that particular base station. It may be noted that base station 301A will generally not have access to the contents of the RRC connection signalling of step N2a and so is reliant on the paging cell indication messaging received in step N5 from the core network to identify the terminal device(s) within its coverage area 303A for which it is to be deemed to have a responsibility for paging in accordance with embodiments of the invention.

In step N7 the MME 305 recognises that a paging instance has arisen for the terminal device 304. The specific cause of the paging instance is not significant and may, for example, be caused by a third party seeking to place a telephone call to the terminal device 304. In cases where only some terminal devices are to be paged in accordance with embodiments of the invention, the MME 305 determines whether the paging instance relates to a terminal device which is to be paged in accordance with an embodiment of the invention or in a conventional manner, such as represented in FIG. 2. If the terminal device is to be paged in a conventional manner, the processing may follow that described above with reference to FIG. 2. However, in this example it is assumed the terminal device for which the paging instance has arisen is to be paged in accordance with embodiments of the invention (for example because it a member of a particular class of terminal device).

In accordance with the principles discussed above, the MME 305 in the core network 302 can recognise the terminal device to be paged is located in one of the communication cells 303A and 303B comprising tracking area 307, but the MME 305 does not know which one. Accordingly, the MME 305 sends a paging request message over the S1-AP interface to each of the base stations associated with the tracking area 307 to identify the terminal device 304 to be paged. This signalling is represented in FIG. 4 by steps N8 and N9 and may be broadly similar to the signalling of steps S6 and S7 for the conventional paging procedure represented in FIG. 2, but with a modification to include an indication that base stations receiving the modified paging requests should respond in accordance with the procedure described further below rather than the conventional manner. The modification may comprise a simple flag, for example carried in a newly defined information element for the S1-AP paging request message signalling, to indicate whether conventional paging procedures or paging procedures in accordance with an embodiment of the invention should be followed. The MME 305 does not send a paging request message to the base station 301C serving communication cell 303C because communication cell 303C is not within tracking area 307 in which the terminal device is taken as being located.

The base stations receiving a modified paging request message from the MME 305, in this case base stations 301A and 301B, are configured to compare the identity of the terminal device identified in association with the paging request with the identities of terminal devices for which they are responsible for paging as indicated in their database established on the basis of steps corresponding to step N6 discussed above. This is schematically represented in step N10 for base station 301B and step N11 for base station 301A.

Because base station 301B has not received a paging cell indication relating to the specific terminal device 304 being paged (because the paging cell indication message of step N5 was only sent to base station 301A with this being the base station through which the initial RRC connection was made by the terminal device 304), the result of the comparison is that the identifier for the terminal device being paged is not in base station 301B's database. As a result, the base station 301B take no action with regards to the paging request. Accordingly, and unlike the conventional approach, the base station 301B does not transmit a paging message for the terminal device 304 (i.e. there is no signalling corresponding to that represented in step S8 of FIG. 2).

However, because base station 301A has previously established in step N6 a record for the identity of the terminal device 304 now being paged in its local database of terminal devices for which the base station is responsible for paging, the result of the comparison of step N11 by base station 301A is a conclusion that the base station 301A is responsible for paging the terminal device being paged. Consequently, the base station 301A proceeds to transmit a paging message for the terminal device 304 in its communication cell 303A. This is schematically represented in step N12. Once the base station 301A has determined that it is responsible for paging the terminal device identified in the modified paging request received from the core network, the process of transmitting the paging message of step N12 may be undertaken in accordance with conventional techniques. In this example it is assumed the terminal device 304, having not moved from the coverage area 303A associated with base station 301A since the initial attachment procedure of step N2, safely receives the paging message of step N12 and responds accordingly, as schematically indicated in step N13. Step N13 and the subsequent signalling associated with the terminal device responding to the paging request by establishing a connection to the network may be performed in accordance with conventional techniques.

It will be appreciated the signalling shown in FIG. 4 is a schematic representation of one example, and there are various variations that could be adopted. Furthermore, it will be appreciated the ordering of many of the steps represented in FIG. 4 is not significant. For example, steps N10 and N11 could be performed in a different order, or more likely may be in effect performed almost simultaneously by the different base stations. Likewise, the modified paging request signalling associated with steps N8 and N9 sent to the different base stations of the tracking area associated with the terminal device 304 could be sent in effect simultaneously or in another order. Similarly, the point at which the terminal device 304 enters idle mode in step N4 may occur at a different stage in the procedure.

It will further be appreciated that the example of the RRC connection setup signalling as represented in step N2 following terminal device switch-on in step N1 is simply one example mechanism for triggering the core network to send a paging cell indication message to indicate a base station should register a specific terminal device identifier in its paging responsibility database. In other examples the core network could be configured to respond similarly whenever an RRC connection is established (i.e. by sending an indication of a terminal device identity to the base station through which the terminal device established RRC connection). As part of conventional RRC connection procedure in wireless telecommunications networks, the base station 301A serving the communication cell 303A through which the terminal device 304 has connected informs the MME 305 of the cell identity (Cell ID) as well as the terminal device's identity. Thus, RRC connection procedures are one mechanism by which the MME 305 can be made aware of which particular base stations are serving which particular terminal devices.

It will further be appreciated that whilst in the example above the paging instance was specific to and identified the individual terminal device 304, a similar approach may be taken for a group paging scheme in which the paging signalling is intended for a group of terminal devices identified by a common identifier.

Thus, in accordance with the principles described above and schematically represented in FIG. 4, a paging procedure is provided which can help avoid the transmission of wasted paging messages, such as paging message transmitted in step S8 of FIG. 2. This is achieved by base stations receiving a paging request from the core network which is modified to indicate the request should be handled in accordance with an embodiment of the invention by selectively transmitting a paging message in their cell in dependence on whether or not the base station considers itself responsible for paging the terminal device based on the contents of a local database identifying terminal devices for which the respective base stations are deemed responsible. In this respect the approach represented in FIG. 4 may be conveniently referred to as a cell-level paging approach (since paging messages may be sent over the radio interface on a per-cell basis) in contrast to the conventional approach of FIG. 2 which may be referred to as a TA-level paging approach (since paging messages are sent over the radio interface on a per-tracking area basis).

A cell-level paging approach may be particularly appropriate for terminal devices which are expected to have sufficiently low mobility that the terminal device will typically remain within the coverage area of a single communication cell. A conventional TA-level paging approach, on the other hand, maybe considered more appropriate for terminal devices which are expected to have relatively high mobility such that the terminal device will be expected to move freely within the coverage area of the various cells comprising a tracking area, and beyond. Between these extremes is the potential for terminal devices which might be expected to have a mobility which causes them to move around within a relatively small number of communication cells. Examples of such devices might be so-called nomadic devices as discussed above. For example, a terminal device which is portable but likely to be stationary when in use, such as a terminal device incorporated within a television or personal computer, might have a level of mobility which causes it to move among a small number of communication cells, for example, a number of communication cells covering a premises where the terminal device is located. With this in mind an approach that is between the two extremes of cell-level paging and conventional tracking area level paging may be adopted as discussed below. Such an approach may be referred to as a cluster-level paging approach. The term "cluster" is not specifically defined in wireless telecommunications systems, but the term is generally used to refer to the combined coverage area of more than one (adjacent) cell, such as two, three, four, five or six cells, for example.

Figure 5:
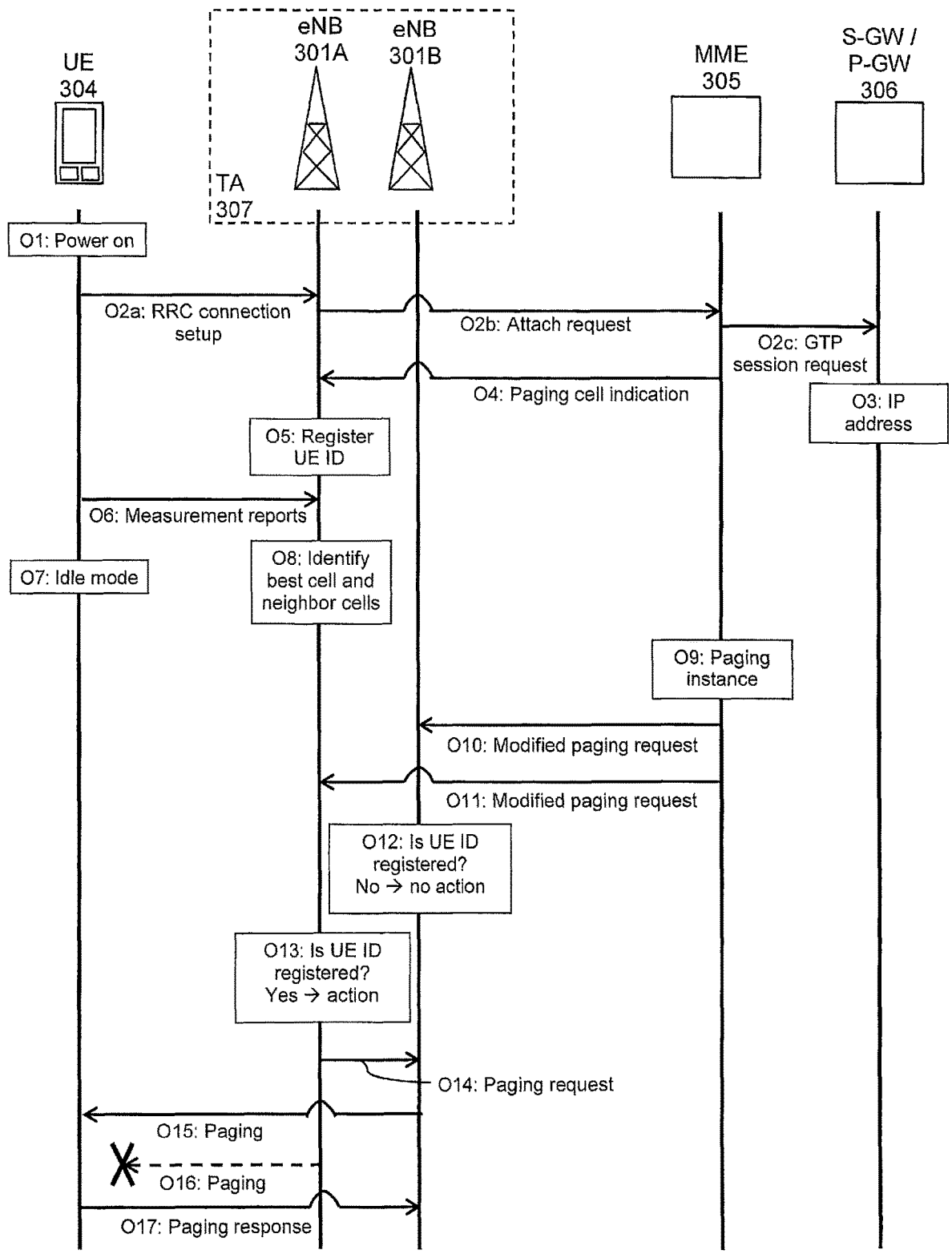
FIGS. 5 and 6 are signalling ladder diagrams schematically representing paging procedure in accordance with certain other embodiments of the invention.

FIG. 5 is a signalling ladder diagram representing a cluster-level paging procedure for a terminal device 304 operating within the LTE-type network schematically represented in FIG. 3 in accordance with another embodiment of the invention. Several of the steps of FIG. 5 are similar to and will be understood from corresponding steps of FIG. 4 and so are not discussed again in detail. As noted above, the tracking area 307 will typically comprise more base stations/communication cells than the two represented in FIG. 5.

For the sake of a specific example, it is assumed here the terminal device 304 initially attaches to the network through base station 301A (i.e. the terminal device 304 is within the coverage area associated with communication cell 303A) and then enters an idle mode. It is also assumed for this particular example the terminal device 304 moves from the coverage of cell 303A to 303B while in the idle mode. This may follow from a physical movement of the device or simply from changing channel conditions meaning the terminal device 304 determines it would be better served by base station 301B supporting communication cell 303B.

Because the communication cells served by the base stations 301A and 301B are within the same tracking area, this movement from the coverage of cell 303A to cell 303B does not give rise to any tracking area updates signalling from the terminal device 304. Accordingly, the base stations and core network remain unaware of the terminal device's movement in this regard.

Step O1, O2, O3, O4 and O5 in FIG. 5 respectively correspond with steps N1, N2, N3, N5 and N6 in FIG. 4. Thus, the terminal device 304 is powered on (step O1), an RRC connection is initiated through base station 301A (step O2, comprising sub-steps O2a, O2b and O2c), the core network registers an IP address for the terminal device (step O3), a paging cell indication message identifying the terminal device 304 is communicated to the base station 301A (step O4), and the base station 301A establishes a record for the terminal device identifier in a paging database (step O5).

As is conventional in wireless telecommunications systems, such as LTE-based wireless communications systems, base stations may communicate with one another, for example over the LTE X2 interface. As is also conventional in wireless telecommunications systems, a terminal device in an RRC connected mode through a particular base station is configured to report the identities (PCI—physical cell identities) associated with other communication cells associated with neighbouring base stations for which reference signalling is being received. The terminal device is also configured to provide measurement reports regarding the power and/or quality of reference signals received from neighbouring base stations (RSRP/RSRQ measurements). This signalling is provided, for example, to assist a serving base station that is deciding on whether to hand over an RRC connected terminal device to a neighbouring base station. Step O6 represented in FIG. 5 schematically shows the terminal device 304 providing this type of conventional measurement report to its serving base station (i.e. the base station 301A in this example). Having transmitted the measurement report regarding the power and/or quality of reference signal transmissions received from other base stations, the terminal device enters an idle mode in step O7.

Although not shown in FIG. 5 in the interests of simplicity, the terminal device 304 and the base station 301A may exchange signalling relating to the terminal device's functional capabilities while it is in RRC connected mode (i.e. prior to switching to idle mode in step O7). As for the examples discussed above, this capability signalling may be exchanged between the RRC connected terminal device and the base station in accordance with the principles underlying existing schemes for exchanging capability information in wireless telecommunications systems. As noted above, and in accordance with conventional approaches, the capability information relating to the terminal device may be discarded by the base station 301A when the RRC connected mode finishes with the terminal device switching to idle mode in step O7. However, in accordance with other embodiments as discussed further below, the base station 301A may retain a record of at least some aspects of the terminal device capability.

In step O8 represented in FIG. 5, the base station 301A to which the terminal device provided the measurement reports in step O6 identifies from the reports what are the best and neighbouring cells for which the terminal device 304 was receiving reference signalling. For example, the base station 301A can determine which are the neighbouring cells (from the point of view of the terminal device 304) from the PCIs associated with the measurement reports received in step O6, and can furthermore identify which cell is able to provide the terminal device with the best channel conditions based on the reports. This information may be stored in association with the terminal device identifier registered in the base station's paging database in step O5.

Steps O9 to O12 in FIG. 5 respectively correspond with steps N7 to N10 in FIG. 4. Thus, in step O9 a paging instance arises for the terminal device 304 (as before, the reason for the paging instance is not significant), the MME 305 consequently transmits modified paging request messages to all base stations within the tracking area 307 (steps O10 and O11), and the base station 301B initially take no action because it does not have the relevant terminal device identifier registered in its paging database.

As with step N11 in FIG. 4, in step O13 in FIG. 5 the base station 301A determines that it has a responsibility for paging the terminal device identified in the paging message received from the core network in step O11 because the terminal device identifier is associated with an entry in its paging database.

In a departure from the cell-level paging approach of FIG. 4, in accordance with the cluster-level paging approach of FIG. 5, the base station 301A having identified that it has a responsibility for paging the terminal device proceeds to transmit a paging request to neighbouring base stations. This "peer-to-peer" paging request is schematically represented in step O14 and maybe communicated with appropriate signalling on an inter-base station interface, such as the X2 interface in an LTE-type network. The paging request may, for example, follow the general format of the paging request received from the core network in step O11 in terms of information content. Thus, a neighbouring base station receiving a paging request in this way is provided with the information necessary to allow it to initiate the transmission of a conventional paging message in its own communication cell. Paging request(s) from the base station 301A may be sent to all neighbouring base stations identified in step O8, or perhaps to only a subset of the identified base stations. For example, the paging request may only be sent to neighbouring base stations deemed to be associated with good quality signalling for the terminal device. In the example represented in FIG. 5 it is assumed the base station 301B is identified in step O8 as a neighbouring base station and so the base station 301A responsible for paging the terminal device based on its database contents transmits the paging request to base station 301B in step O14. It is furthermore assumed in this example that no other neighbouring base stations are identified, thus, no other base stations comprising the tracking area 307 receive a paging request of the kind represented in step O14.

In accordance with this embodiment of the invention the base station 301A for which the terminal device identifier is registered in its paging database and the neighbouring base station(s) which receive a paging request from the base station 301A (i.e. in this example base station 301B) are configured to transmit conventional paging signalling to seek to establish contact with the terminal device 304. This is schematically represented in steps O15 and O16. As noted above, it is assumed for this example the terminal device 304 has moved to the coverage area 303B of base station 301B and so receives the paging signalling transmitted in step O15 by base station 301B, and responds accordingly, as schematically indicated in step O17. The paging signalling sent in step O16 by base station 301A is, however, not received by the terminal device 304 (because it has moved to a different cell).

Following step O17, the various elements represented in FIG. 5 may continue to exchange signalling in accordance with conventional techniques, for example depending on why the paging instance arose in step O9.

Thus, in accordance with the approach of FIG. 5, a paging scheme is provided which supports the transmission of paging signalling across the radio access network in a restricted subset of communication cells from within a plurality of communication cells comprising a particular tracking area. This approach thus allows for paging of devices which might be expected to move among a relatively small number of neighbouring base stations. This approach does include what might be considered a degree of "wasted" paging signalling (such as in step O16), but the amount of wasted signalling is less than for the conventional tracking area level approach (since only a subset of neighbouring base stations within a tracking area transmit paging signalling across the radio access network).

Thus, while a cell-level paging approach may be appropriate for relatively low-mobility terminal devices, and a conventional tracking area-level paging approach may be appropriate for terminal devices with relatively high mobility, FIG. 5 represents a cluster-level approach which may be appropriate for terminal devices classified as having an intermediate level of mobility.

It will be appreciated the approach of FIG. 5 can be modified in accordance with other embodiments of the invention. For example, in some circumstances the identification of neighbouring base stations to which a base station should communicate peer-to-peer paging request signalling might not be based on using measurement reports received from the terminal device. Instead, the cluster of neighbouring base stations for each given base station may be predefined, for example during an initial network deployment or update phase, so that the for each base station the identities of neighbouring base stations to which it should send peer-to-peer paging request is in effect hardwired.

Thus, in accordance with the principles described above, terminal devices may be paged in accordance with different procedures according to their expected mobilities. Thus, the most appropriate paging mechanism to use for a given paging instance may be selected according to the expected mobility of the terminal device. It will, however, be appreciated the most appropriate paging approach to use in particular circumstances may vary by implementation. For example, in some implementations some terminal device characterised as having relatively low mobility may be served using a cell-level paging approach while other terminal devices having similar low mobility may be served using a conventional paging approach. For example, in some implementations it may be considered appropriate for terminal devices which are self-powered (e.g. by battery) to adopt a cell-level paging approach whilst terminal devices which externally powered (e.g. by a mains connection) may be paged using a conventional approach.

In some implementations a network may in effect be configured to learn the abilities of terminal devices based on their previous behaviour or may be provided with configuration information regarding the mobility of terminal devices. In principle this could be established in a permanent database for all terminal devices which might access the network. However, it may be preferable in other cases for terminal devices to in effect advertise their mobility characteristics when connecting to a network. The network and may then maintain a record of his characteristic and initiate paging procedures in whichever manner is considered most appropriate.

Conventional wireless telecommunications systems support features whereby a terminal device may be defined according to category. These characteristics may be based, for example, on terminal device capabilities such as the number of MIMO antennas, downlink/uplink peak data rates, and so on. However, in accordance with embodiments of the invention, a new category of terminal device capability may be defined relating to its expected level of mobility. Terminal devices may then be configured to communicate this category information to a network, for example in association with conventional capability information, to allow the network to select an appropriate paging procedure for the terminal device.

For example, a first type of terminal device mobility category ("low mobility") may be characterised by terminal devices which are expected to be used in a fixed position, such as smart meters. A second type of terminal device category ("intermediate mobility") may be characterised by terminal devices which are expected to be mobile within a relatively small area, such as home personal computers, televisions, etc. A third type of terminal device category ("high mobility") may be characterised by terminal devices which are expected to roam freely within a tracking area and beyond, such as conventional mobile handsets. A given terminal device may be configured into one of these categories, for example during manufacture or installation, and arranged to communicate the mobility category information to the network during a camp-on procedure, for example. Different categories of terminal device may then be paged according to different procedures. For example, the network may be configured to page terminal devices of the first category ("low mobility") with a cell-level paging approach, and to page terminal devices of the second category ("intermediate mobility") with a cluster-level paging approach, and to page other terminal devices with a conventional tracking-area paging approach. In accordance with some embodiments it may be that mobility capability information is only conveyed to the network for the first and second categories of terminal device having a degree of restricted mobility. Any device not conveying a restricted mobility capability information may thus be assumed to be a conventional high mobility device and be paged using conventional tracking area paging accordingly. This provides backward compatibility for existing terminal devices.

Mobility capability may be expressly specified, for example a device may be expressly specified as being a low mobility/fixed installation type of terminal device. Alternatively, mobility capability may be derived from other characteristics of the terminal device. For example, in accordance with some embodiments a terminal device may be configured to exchange information with a network indicating whether the terminal device is self-powered (e.g. battery powered) or provided with an external power supply (e.g. mains powered). A terminal device indicated as being mains powered may be taken to be a terminal device which is relatively static when in use (although as noted above, it may be in some implementations that a terminal device which is mains powered is chosen to be served by conventional TA-level paging, even though it may be relatively stationary). Thus, in accordance with some embodiments of the invention a terminal device may be configured to provide a base station with an indication of its degree of mobility/power source. This information may be conveyed, for example, in one or more additional information elements defined for otherwise conventional UE capability information messages exchanged in the wireless telecommunications system between a terminal device and a base station to which it is RRC connected. As noted above, in accordance with conventional techniques the capability information relating to terminal devices is generally discarded by a base station once the base station switches to idle mode. However, in accordance with embodiments of the invention at least some aspects of the terminal device capability information may be retained in the network when the terminal device switches to idle mode. The retained information may be stored in the paging database in association with the identifier for the relevant terminal device. This capability information, for example regarding the extent to which the terminal device might be expected to move between communication cells and/or whether the terminal device is self-powered or externally powered, may then be used by the base station to establish an appropriate paging mechanism for the terminal device in accordance with the principles discussed above.

One mechanism whereby an association between a terminal device identity and its capabilities may be recorded in a paging database in accordance with an embodiment of the invention is as follows. As explained above, conventional wireless telecommunications systems allow for the exchange of capability information in RRC connected mode. Furthermore, conventional wireless telemetry can occasion system is allow for a MME to request capability information for a particular terminal device from a base station. Thus, in accordance with some embodiments of the invention, the MME 305 may be configured to request UE capability information for the terminal device 304 from the base station 301A whilst it is in RRC connected mode (i.e. before steps N4 and O5 in FIGS. 4 and 5 respectively). As is conventional, the base station will respond by providing the MME 305 with an indication of the terminal devices capability information. The MME may then extract the relevant information for the implementation at hand (for example information relating to the terminal device's degree of mobility or its source of power), and includes this in association with the terminal device identifier in paging cell indication signalling corresponding to that represented in steps N5 and O5 of FIGS. 4 and 5. The base station receiving paging cell indication signalling including an indication of UE capability may record the relevant information in association with the terminal device ID in its database. Thus, when a paging request is received for the particular terminal device, the base station is able to establish from the database what are the capabilities of the terminal device, and to take account of these when determining the most appropriate paging mechanism.

Another approach to populating a paging database with an indication of a terminal device's category/capability as regards mobility/power source might not rely on conventional capability information signalling as discussed above. For example, existing wireless telecommunications systems allow for the definition of different causes for establishing RRC connection requests. Information elements relating to the cause of a given RRC connection request are communicated from the terminal device in its RRC connection setup signalling (i.e. the signalling schematically represented in steps N2*a*, O2*a* in FIGS. 4 and 5). One already-established cause for initiating an RRC connection in certain wireless telecommunications systems is for the transfer of data which is indicated as being delay tolerant. This establishment cause is defined to help a base station to prioritise resources. Delay tolerance is a typical characteristic of MTC devices, and so in some respects an indication of a delay tolerant access in effect means access from an MTC device. A conventional aspect of wireless telecommunications systems, such as LTE-based systems, is that RRC establishment cause information is passed to the MME 305 through the conventional signalling. Thus, in accordance with this approach, the MME 305 may extract an indication of a terminal device's degree of mobility based on the particular establishment cause that has been used. The MME may then include an appropriate indication of this in association with the terminal device identifier in paging cell indication signalling corresponding to that represented in steps N5 and O5 of FIGS. 4 and 5. The base station receiving the signalling may thus record the relevant information in association with the terminal device ID in its database and refer to this information when determining an appropriate paging approach for the terminal device.

In other examples a base station may be configured to determine an appropriate paging scheme on a case-by-case basis. For example, the base station may be configured to estimate a terminal devices' speed, for example based on conventional AFC (auto frequency control) procedures that are provided to allow fine adjustment of carrier frequencies to compensate for Doppler shifts.

In accordance with the principles described above, only a subset of base stations within a tracking area need send a paging request across the radio access network within their communication cell for a terminal device. If a terminal device has not moved out of the coverage of the cells transmitting the paging request, this allows successful paging with a reduction in wasted paging signalling from other base stations in the relevant tracking area. However, if a terminal device has for some reason moved from the coverage of the base stations transmitting the paging request signalling, the terminal device will not receive the paging request. With this in mind, in accordance with some embodiments of the invention, paging procedure may be configured to revert to conventional tracking-area paging procedures in the event a terminal device does not initially respond to paging in accordance with the principles described above. An approach of this kind is schematically represented in FIG. 6.

Figure 6:
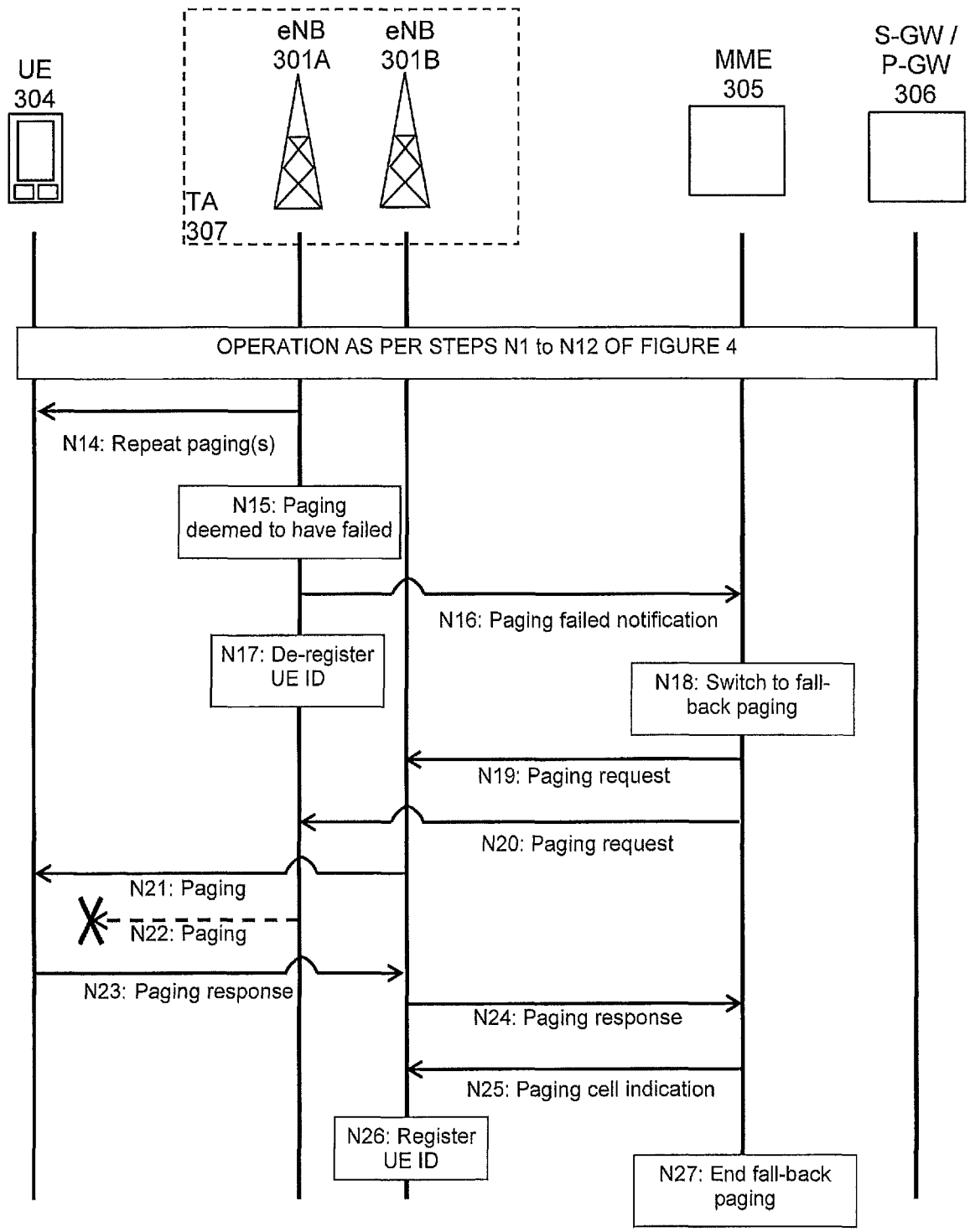

FIG. 6 is a signalling ladder diagram representing a paging procedure for a terminal device 304 operating within the LTE-type network schematically represented in FIG. 3 in accordance with another embodiment of the invention. FIG. 6 is similar to, and will be understood from, FIG. 4. However, whereas for the example of FIG. 4 it is assumed the terminal device 304 remains within the coverage of base station 301A throughout the procedure, for the example of FIG. 6, it is assumed the terminal device 304 moves out of the coverage area 303A of the base station 301A which has assumed paging responsibility for the terminal device and into the coverage area 303B associated with the base station 301B.

Thus, the initial operation represented in FIG. 6 follows steps N1 to N12. However, unlike the example of FIG. 4, in the example of FIG. 6, it is assumed there is no paging response signalling received by the base station 301A in response to the paging signalling sent in step N12 (i.e. for the example of FIG. 6 there is no paging response signalling corresponding to step N13 in FIG. 4). As noted above, this is because the terminal device 304 is assumed to have moved away from the coverage of the communication cell 301A associated with base station 301A.

In accordance with the embodiment of the invention represented in FIG. 6 the base station 301A transmits one or more repeat paging messages as schematically represented in step N14. After a given number of attempts, or after a defined time has expired, the base station 301A determines in step N15 that paging has failed for the terminal device.

In step N16 the base station 301A sends a message to the MME 305 to indicate the paging has failed. In step N17 the base station 301A removes the identity of the relevant terminal device from its paging database. This in effect reflects the fact the base station 301A should not remain responsible for paging the terminal device because it has been unable to reach it.

In step N18 the MME 305 switches to a fall-back paging mode of operation corresponding to conventional tracking-area paging request for the terminal device being paged.

Thus, in steps N19 and N20 the MME 305 sends conventional paging requests to all base stations within the tracking area 307, and the base stations respond by sending conventional paging messages across their respective radio access interfaces, as schematically represented by steps N21 and N22 in FIG. 6.

The paging message sent by a base station 301A in step N22 is not received by the terminal device 304, because the terminal device is no longer within the coverage area of base station 301A. However, the paging request sent by base station 301B in step N21 is received by the terminal device 304 because the terminal device in this example has moved into the coverage area 303B associated with terminal device 301B.

On receiving the paging signalling from the base station 301B in step N21, the terminal device 304 responds with a conventional paging response in step N23. In accordance with conventional techniques, the base station 301B receiving the paging response from the terminal device 304 in step N23 forwards this to the MME 305 as schematically represented in step N24. The continuing operation as regards the paging process for the terminal device may proceed as normal (not represented in FIG. 6).

In addition to completing the paging procedure, in accordance with this embodiment of the invention, the MME 305 having recognised that the paging response has come through base station 301B transmits signalling back to the base station 301B to indicate the identity of the terminal device 304 should be recorded in the paging database of base station 301B. This signalling is schematically represented in step N25 and may broadly correspond with the paging cell indication sent in step N5 of FIG. 4 as discussed above.

In step N26 the base station 301B receiving the paging cell indication message from the MME 305 in step N25 establishes a record of the identifier for the indicated terminal device in a paging database associated with the base station 301B. This step is similar to, and will be understood from, step N5 of FIG. 4 as discussed above.

In step N27 the MME 305 in effect deactivates the fallback paging process for the terminal device so that next time the terminal device is paged the procedures will follow those discussed above in accordance with an embodiment of the invention.

Thus, the approach of FIG. 6 provides a scheme whereby a terminal device that has moved further than expected, can be paged using conventional tracking area paging as a fallback. Furthermore, this process can involve updating the paging databases in the respective base stations to reflect the changing location of the terminal device.

Although not specifically shown in FIG. 5, it will be appreciated that steps corresponding to steps N24, N25 and N26 could also be applied to the approach of FIG. 5 following step O17 to update the paging database of the base station through which the paging response from the terminal device is ultimately received. Furthermore, in the approach of FIG. 5, a base station which considers itself to be responsible for paging a particular terminal device and ask neighbouring base stations to page the terminal device (i.e. base station 301A in FIG. 5), but which does not receive a response to its own paging request signalling transmitted for the terminal device in its communication cell may deregister the terminal device identifier from its own paging database in a step corresponding to step N17 of FIG. 6.

It will be appreciated the approach of FIG. 6 can be modified in accordance with other embodiments of the invention. For example, whereas in FIG. 6 the base station 301A reports failed paging to the MME 305 in step N16 so that the MME 305 takes control of initiating a full-back paging procedures, in accordance with other embodiments, the base station 301A might itself take responsibility for initiating paging by neighbouring base stations in response to not receiving any response to own paging requests. For example, a base station may initially follow a cell-level paging approach as schematic represented in FIG. 4, and, if it does not receive a response from the terminal device, may switch to a cluster-level paging approach as schematically represented in FIG. 5 with appropriate peer-to-peer paging request signalling of the type schematically represented in step O14 of FIG. 5.

In yet other examples, it will be appreciated the core network itself may be responsible for determining when to switch to a fall-back (wider) paging approach. For example, a core network element may first initiate a cell-level paging approach of the kind represented in FIG. 4. If after some predefined period or number of attempts at cell-level paging the core network has not received a paging response indication, the cell network may initiate a wider paging approach, such as a cluster-level paging approach or a conventional tracking area paging approach in accordance with the principles described above.

In some implementations certain classes of terminal device, for example machine type communication terminal devices which can typically accommodate relatively high latencies, may be configured to adopt relatively long latency periods to minimise power usage. Accordingly, there may be a desire for such terminals devices to "wake up" for fewer paging occasions than for other terminal devices. This might be achieved by sending the DRX cycle for such terminal devices, this may not always be a possible or appropriate approach. It may also not be appropriate to simply allow the terminal devices to decide when to wake up to read the paging channel because the network needs to know when the terminal device will be "awake" and reading this channel. Yet another approach in accordance with embodiments of the invention is the provision of an alternative paging identifier for certain classes of terminal devices. As noted above, single paging identifier is typically used in wireless telecommunications systems, for example P-RNTI in LTE-based systems. However, providing an alternate paging identifier, for example which might be referred to as MTC-RNTI, which is specific to certain classes of devices for which fewer paging occasions are desired might be adopted. Thus, a terminal device which is configured to react to the new paging identifier MTC-RNTI may be configured to in effect ignore the conventional paging identifier P-RNTI. This approach would release the terminal devices reliant on the new paging identifier from the task of reading paging occasions associated with the paging identifier P-RNTI employed for conventional terminal devices.

When a core network element, such as an MME, sends a paging message over the S1 interface to base stations in a tracking area the relevant terminal device's non-access stratum (NAS) identity is associated with the message. Following the principles described above, for example with reference to steps N1 to N6 of FIG. 4, embodiments of the invention can provide a mechanism to allow base stations to maintain a local paging database indicative of terminal devices which have established an RRC connection through the base station, and which the base station is hence deemed to have a responsibility for paging. In accordance with embodiments of the invention a base station may be configured to record in their paging database an indication of a terminal device's tolerance to delays in association with the respective terminal device identifiers for which they are responsible for paging. This information may be obtained in a manner similar to that described above regarding schemes for providing a base station with an indication of a terminal device capabilities as regards expected mobility. That is to say, a terminal device's tolerance for delay may be considered as another capability parameter of the terminal device to be reported to the network in accordance with broadly conventional techniques.

When a paging message is received for a terminal device for which a base station is deemed to have a paging responsibility, the base station may further determine whether or not the particular terminal device is associated with data which is considered to be delay tolerant. If it is considered the terminal device is associated with delay tolerant data, the base station may send a paging message addressed to the new MTC-RNTI. If it is considered the terminal devices associated with non-delay tolerant data, the base station may send a paging message addressed in the conventional P-RNTI.

Thus in accordance with the principles described above, paging procedures can be provided which can result in a reduced usage of radio resources (e.g. PDCCH/PDSCH in LTE) and also fewer false paging events for terminal devices.

While some of the embodiments described above are based on an approach in which a core network element may be configured to send a modified paging request to indicate that a particular paging approach in accordance with an embodiment of the invention should be adopted in place of conventional paging, in other examples modified paging messages may not be used. For example, base stations may be configured to respond to all new paging requests received from the core network by selectively transmitting paging signalling in dependence on whether an identifier for the paged terminal device is recorded in their database entries. However, if the base station subsequently receives a repeat paging request for the same terminal device from the core network, for example within a particular period, the base station may interpret this as an indication that the first paging request has failed. The base station may thus be configured to transmit paging signalling irrespective of its database contents when it receives a repeated paging request from the core network in case the terminal device has moved into its own coverage area.

While the above-described embodiments are primarily focused on applications of paging procedures for machine type communication terminal devices, the same principles can be applied for other types of terminal devices. For example, it will naturally be the case that some terminal devices are less mobile than others, for example depending on the different lifestyles of users of the terminal devices. A network may thus be configured to recognise which terminal devices have low mobility, for example based on the extent of tracking area update information previously received for particular terminal devices, and treat paging for certain terminal devices in accordance with the above-described principles if they are identified as having relatively low mobility. Furthermore terminal devices may have different mobilities at different times of day. For example, a typical terminal device might be relatively stationary during the night time and working hours, but become more mobile during morning and evening times used for commuting. The network may be configured to recognise when terminal devices have relatively low mobility, and adopt paging procedures in accordance with the above-described principles during those times.

It will be appreciated that various modifications can be made to the embodiments described above without departing from the scope of the present invention as defined in the appended claims. In particular although embodiments of the invention have been described with reference to a LTE mobile radio network, it will be appreciated that the present invention can be applied to other forms of network such as GSM, 3G/UMTS, CDMA2000, etc. The term user equipment (UE) as used herein can be replaced with other terms user equipment (UE), mobile communications device, terminal device etc. Furthermore, although the term base station has been used interchangeably with eNodeB it should be understood that there is no difference in functionality between these network entities.

Thus, there has been described a method of paging in a wireless telecommunications system. A core network element selects a base station from among a plurality of base stations comprising a tracking area to have primary responsibility for paging a terminal device and conveys an indication of the terminal device to the selected base station. This allows the selected base station to identify the terminal device as one which it has a responsibility for paging. Each base station maintains a paging database identifying one or more terminal devices for which it has a responsibility for paging. When a terminal device is to be paged, the core network element transmits a paging request to the plurality of base stations comprising the tracking area. The respective base stations then determine whether or not to onward transmit a paging message for the terminal device based on a comparison between an identifier for the terminal device being paged with entries in their paging database. If a base station determines from this comparison that it has a responsibility for paging the terminal device, it will transmit a paging message accordingly. If a base station determines from this comparison that it does not have a responsibility for paging the terminal device, it will not act on the paging request received from the core network. Thus an approach is provided which can have a reduced amount of paging signalling as compared to conventional techniques.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] ETSI TS 122 368 V10.530 (2011 July)/3GPP TS 22.368 version 10.5.0 Release 10
[2] Holma H. and Toskala A, "LTE for UMTS OFDMA and SC-FDMA based radio access", John Wiley and Sons, 2009
[3] ETSI TS 136 321 V8.9.0 (2010 July)/3GPP TS 36.321 version 8.9.0 Release 8
[4] ETSI TS 136 331 V11.2.0 (2013 February)/3GPP TS 36.331 version 11.2.0 Release 11

The invention claimed is:

1. A method of operating a core network element in a core network of a wireless telecommunications system comprising the core network, a plurality of base stations and a plurality of terminal devices, the method comprising:
selecting, by the core network element, a base station from among the plurality of base stations to have a responsibility for paging a specific terminal device;
conveying, by the core network element, an indication of the specific terminal device to only the selected base station;
subsequently determining, by the core network element, that the specific terminal device should be paged after conveying the indication of the specific terminal device to only the selected base station; and
transmitting, by the core network element, a paging request conveying an identifier for the specific terminal device to the plurality of base stations including the selected base station after determining that the specific terminal device should be paged, wherein
only the selected base station, among the plurality of base stations receiving the paging request, transmits a paging signal to the specific terminal device.

2. The method of claim 1, wherein the selected base station is selected on the basis of it being a base station through which the core network has previously received uplink signaling associated with the specific terminal device.

3. The method of claim 2, wherein the selected base station is a base station through which the core network has most recently received uplink signaling from the specific terminal device.

4. The method of claim 2, wherein the uplink signaling associated with the specific terminal device comprises signaling for establishing a radio resource control, RRC, connection.

5. The method of claim 4, wherein the signaling for establishing a RRC connection for the specific terminal device is associated with a network attach procedure for the specific terminal device.

6. The method of claim 2, wherein the uplink signaling associated with the specific terminal device comprises a response to a previous paging request for the specific terminal device.

7. The method of claim 1, further comprising:
transmitting a further paging request conveying an identifier for the specific terminal device to a plurality of base stations.

8. The method of claim 7, wherein the first mentioned paging request and the further paging request are transmitted with different characteristics to indicate a base station should respond differently to the first mentioned paging request and the further paging request.

9. The method of claim 7, wherein the further paging request is transmitted in response to receiving signaling from the selected base station which indicates the selected base station has not received a response to a paging message transmitted by the selected base station for the specific terminal device.

10. The method of claim 7, wherein the further paging request is transmitted in response to the core network element not receiving a successful paging response associated with the specific terminal device.

11. The method of claim 1, wherein the plurality of base stations comprises a tracking area of the wireless telecommunications system.

12. The method of claim 1, wherein the paging request further conveys an indication of a way in which a base station receiving the paging request should react which is selected form a plurality of different ways in which a base station receiving a paging request could react.

13. The method of claim 12, wherein the plurality of different ways in which a base station receiving a paging request could react relate to how the base station should determine whether or not to transmit a paging message for the specific terminal device in response to receiving a paging request.

14. A core network element for operating a core network of a wireless telecommunications system comprising the core network, a plurality of base stations and a plurality of terminal devices, wherein the core network element is configured to:
select a base station from among the plurality of base stations to have a responsibility for paging a specific terminal device;

convey an indication of the specific terminal device to only the selected base station;

subsequently determine the specific terminal device should be paged after conveying the indication of the specific terminal device to only the selected base station; and transmit a paging request conveying an identifier for the specific terminal device to the plurality of base stations including the selected base station after determining that the specific terminal device should be paged, wherein only the selected base station, among the plurality of base stations receiving the paging request, transmits a paging signal to the specific terminal device.

15. The core network element of claim 14, wherein the core network element is configured such that the selected base station is selected on the basis of it being a base station through which the core network has previously received uplink signaling associated with the specific terminal device.

16. The core network element of claim 15, wherein the core network element is configured such that the selected base station is a base station through which the core network has most recently received uplink signaling from the specific terminal device.

17. The core network element of claim 15, wherein the core network element is configured such that the uplink signaling associated with the specific terminal device comprises signaling for establishing a radio resource control, RRC, connection.

18. The core network element of claim 17, wherein the core network element is configured such that the signaling for establishing a RRC connection for the specific terminal device is associated with a network attach procedure for the specific terminal device.

19. The core network element of claim 15, wherein the core network element is configured such that the uplink signaling associated with the specific terminal device comprises a response to a previous paging request for the specific terminal device.

20. The core network element of claim 14, wherein the core network element is configured to transmit a further paging request conveying an identifier for the specific terminal device to a plurality of base stations.

21. The core network element of claim 20, wherein the core network element is configured such that the first mentioned paging request and the further paging request are transmitted with different characteristics to indicate a base station should respond differently to the first mentioned paging request and the further paging request.

22. The core network element of claim 20, wherein the core network element is configured such that the further paging request is transmitted in response to receiving signaling from the selected base station which indicates the selected base station has not received a response to a paging message transmitted by the selected base station for the specific terminal device.

23. The core network element of claim 20, wherein the core network element is configured such that the further paging request is transmitted in response to the core network element not receiving a successful paging response associated with the specific terminal device.

24. The core network element of claim 14, wherein the core network element is configured such that the paging request further conveys an indication of a way in which a base station receiving the paging request should react which is selected form a plurality of different ways in which a base station receiving a paging request could react.

* * * * *